(12) United States Patent
Wassermann et al.

(10) Patent No.: US 10,061,059 B2
(45) Date of Patent: Aug. 28, 2018

(54) NOISE CANCELLATION IN WELLBORE SYSTEM

(75) Inventors: Ingolf Wassermann, Hannover (DE); Jose I. Alonso Ortiz, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 2091 days.

(21) Appl. No.: 12/170,573

(22) Filed: Jul. 10, 2008

(65) Prior Publication Data

US 2009/0135023 A1 May 28, 2009

Related U.S. Application Data

(60) Provisional application No. 60/949,595, filed on Jul. 13, 2007.

(51) Int. Cl.
*G01V 3/00* (2006.01)
*G01V 11/00* (2006.01)

(52) U.S. Cl.
CPC .................................. *G01V 11/002* (2013.01)

(58) Field of Classification Search
CPC ........ E21B 47/12; E21B 47/06; E21B 47/082; G01V 1/22; G01R 29/26; G01R 23/16; G06K 9/00503; H04B 1/1027
USPC ........ 702/189, 190, 191; 340/855.4; 267/83; 181/105; 175/40
See application file for complete search history.

(56) References Cited

U.S. PATENT DOCUMENTS

| | | | |
|---|---|---|---|
| 4,642,800 A * | 2/1987 | Umeda | 367/85 |
| 4,980,682 A * | 12/1990 | Klein et al. | 340/854.6 |
| 5,077,697 A * | 12/1991 | Chang | 367/31 |
| 5,146,433 A | 9/1992 | Kosmala et al. | |
| 5,150,333 A * | 9/1992 | Scherbatskoy | 367/83 |
| 5,850,369 A * | 12/1998 | Rorden et al. | 367/83 |
| 6,246,962 B1 * | 6/2001 | Schultz et al. | 702/6 |
| 6,247,542 B1 * | 6/2001 | Kruspe et al. | 175/40 |
| 6,308,562 B1 * | 10/2001 | Abdallah et al. | 73/152.18 |
| 6,421,298 B1 | 7/2002 | Beattie et al. | |
| 6,741,185 B2 * | 5/2004 | Shi et al. | 340/853.2 |
| 6,781,520 B1 | 8/2004 | Smith et al. | |
| 7,313,052 B2 * | 12/2007 | Fincher et al. | 367/83 |
| 7,577,528 B2 * | 8/2009 | Li et al. | 702/6 |
| 2002/0144842 A1 * | 10/2002 | Schultz et al. | 175/39 |
| 2002/0148646 A1 * | 10/2002 | Schultz et al. | 175/39 |
| 2004/0155794 A1 * | 8/2004 | Gardner | 340/855.7 |

(Continued)

FOREIGN PATENT DOCUMENTS

GB 2396011 A 6/2004
WO 2009012147 A3 1/2009

OTHER PUBLICATIONS

Haykin, Simon. "Adaptive Filter Theory," Chapter 6: "Linear Prediction." 3rd edition, Upper Saddle River: Prentice-Hall, Inc., 1995. pp. 241-301.

(Continued)

*Primary Examiner* — Shane Bomar
(74) *Attorney, Agent, or Firm* — Cantor Colburn LLP

(57) ABSTRACT

A method of canceling noise in a wellbore telemetry system includes, acquiring at least one signal in the system, predicting at least one deterministic component of the at least one signal based upon a change of at least one deterministic component from past signal values, and subtracting the at least one predicted deterministic component from the acquired at least one signal.

11 Claims, 3 Drawing Sheets

(56) References Cited

U.S. PATENT DOCUMENTS

2004/0172199 A1    9/2004  Chavarria et al.
2006/0098531 A1*   5/2006  Gardner et al.
2006/0114747 A1*   6/2006  Hentati et al. .................. 367/83
2007/0132606 A1*   6/2007  Reckmann et al. ....... 340/855.4

OTHER PUBLICATIONS

Diniz, Paulo S.R. "Adaptive Filtering," 2nd Edition, Norwell: Kluwer Academic Publishers, 2002. pp. 8-13.
Proakis, John G., et al. "Algorithms for Statistical Signal Processing," 1st Edition, Upper Saddle River: Prentice Hall, 2002. pp. 125-178.
Canadian Office Action for CA Application No. 2,692,754, dated Aug. 28, 2012, pp. 1-3.
International Preliminary Report on Patentability and Written Opinion for PCT Application No. PCT/US2008/069790, dated Jan. 19, 2010, pp. 1-6.
International Search Report for PCT Application No. PCT/US2008/069790, dated Jun. 19, 2009, pp. 1-3.

* cited by examiner

US 10,061,059 B2

NOISE CANCELLATION IN WELLBORE SYSTEM

CROSS REFERENCE TO RELATED APPLICATION

This application claims priority to U.S. provisional application, 60/949,595, filed Jul. 13, 2007, the entire contents of which are incorporated herein by reference.

BACKGROUND OF THE INVENTION

In mud pulse telemetry data from down hole is transmitted to surface using pressure pulses generated by a pulser. Pressure sensors at surface measure the pressure changes over time that represent the data.

The pulser, however, is not the only source of pressure changes in a well. Other pressure varying sources, such as pumps, for example, which circulate mud within the well, also generate pressure changes. These pressure changes act as noise for the mud pulse transmission. In fact, pumps are generally also located at surface and are therefore closer to the pressure sensors and, as such, are a dominant source of noise. Signals received by the sensors that are generated by such pumps typically have higher energy than do the received telemetric data signals since the telemetric signals get highly attenuated while traveling from down hole to surface. As such, accurate detection of the telemetric data signals can be difficult. Methods to allow for accurate detection of the telemetric data signals in the presence of pump noise would be well received in the art.

BRIEF DESCRIPTION OF THE INVENTION

Disclosed herein is a method of canceling noise in a wellbore telemetry system. The method includes, acquiring at least one signal in the system, predicting at least one deterministic component of the at least one signal based upon a change of at least one deterministic component from past signal values, and subtracting the at least one predicted deterministic component from the acquired at least one signal.

Further disclosed herein is a processor readable media having stored thereon a processor program product that is executed by the processor, the processor program product for canceling noise in a wellbore telemetry system in a processor environment, the processor program product comprising a storage medium readable by a processing circuit and storing instructions for execution by the processing circuit the processor readable media being readable by a processing circuit and the processor program product having instructions for execution by the processing circuit for facilitating a method. The method includes, acquiring at least one signal in the system, predicting at least one deterministic component of the at least one signal based upon a change of at least one deterministic component from past signal values, and subtracting the at least one predicted deterministic component from the acquired at least one signal.

Further disclosed herein is a method of canceling noise in a downhole telemetry system. The method includes, acquiring at least one signal in the system, predicting at least one deterministic component of the at least one signal based upon one of at least one deterministic component from a past signal values and a change of at least one deterministic component from past signal values, and subtracting the at least one predicted deterministic component from the acquired at least one signal.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
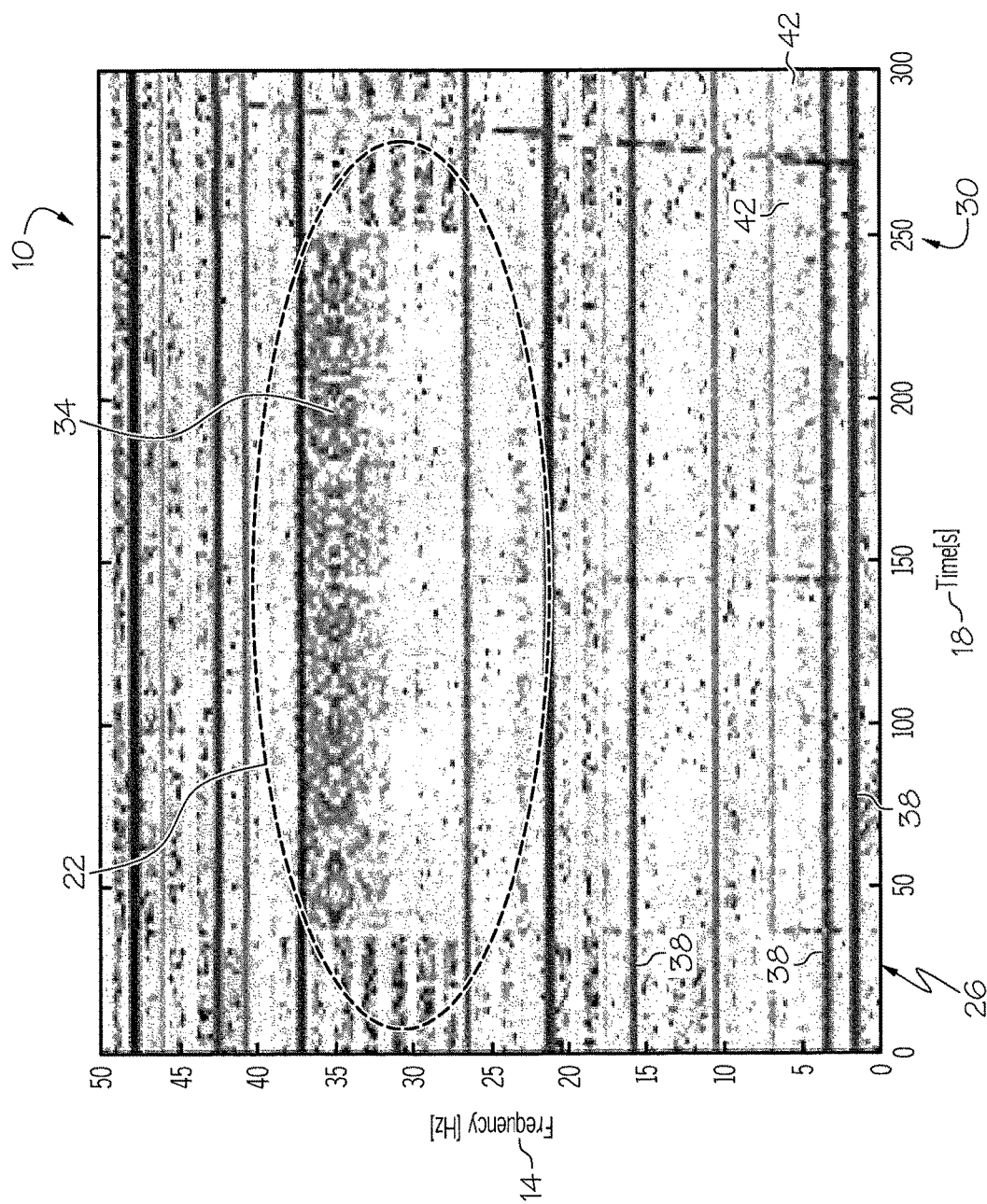
FIG. 1 depicts a spectrogram of signals received by a sensor in a mud pulse telemetry system.

Embodiments of the system disclosed herein are used during downhole measurement and telemetric communication such as the techniques of logging while drilling (LWD) and measurement while drilling (MWD), for example. It should be understood that although embodiments disclosed herein describe a system with telemetry from downhole to surface, alternate embodiments could include telemetry from surface to downhole as well as bidirectional telemetry. Additionally, embodiment may include telemetry between any desired positions within a well, such as, between a first downhole position and a second downhole position, for example. Referring to FIG. 1, a spectrogram 10 of a signal received from a sensor is illustrated. The spectrogram 10 is a plot of frequency 14 in hertz on the Y-axis versus time 18 in seconds on the X-axis. The spectrogram 10 is made such that the higher the energy of the received signal at a given frequency the darker the representation on the spectrogram 10. The darkest areas, therefore, represent frequencies with high magnitudes of pressure pulsing. By contrast, the lightest areas represent frequencies with the lowest magnitude of pressure pulsing.

Knowing some specifics about the frequency of the pulses being generated by the pulser and when the pulser is actually transmitting telemetric data helps to identify transmitted telemetric data signal 22 on the spectrogram 10. In the example of FIG. 1, the pulser began transmitting telemetric data at the 40-second mark 26 and stopped transmitting telemetric data at the 250-second mark 30. In this example the majority of the telemetric data is transmitted at a frequency of between 30 and 40 hertz. As such the telemetric data signal 22 can be identified by the dark area 34 positioned between the 40-second mark 26 and the 250-second mark 30 on the X-axis, and between the 30 hertz and the 40 hertz frequencies on the Y-axis.

The spectrogram 10 also includes several dark horizontal lines 38. These dark horizontal lines 38 represent noise from one or more pumps. The frequencies of the pumps' noise correlate with frequencies of operation of the pumps themselves. As such the pumps' noise is periodic and thus deterministic in nature with the periodicity being proportional to the frequency of operation of the pumps. It should be noted that although the periodic noise described in embodiments herein is pump noise, in alternate embodiments the periodic noise could be from other sources. Such sources include, mud motors, rotating bits, rotating drillstrings, reciprocating members and pulsing members, for example. In such alternate embodiment the periodic noise could be attributed to these alternate sources of periodic noise.

The spectrogram 10 also includes random dark speckles 42 that are from other undefined sources of noise. Such other noises can occur at various frequencies, various magnitudes and at various times. The magnitude of signals from these other noises may be low enough in the frequency range of the transmitted telemetric data signal 22 such that the data transmitted in the telemetric data signal 22 is legible above the other noises.

The strength of the pump noise, being greater than the strength of the telemetric data signal 22 complicates deciphering the telemetric data signal 22 from the pump noise. It is, therefore, desirable to attenuate the magnitude of the pump noise to levels below that of the data. An embodiment of the invention uses the deterministic nature of the pump noise to attenuate the effect of the pump noise. This embodiment performs such attenuation even while the pump frequencies are changing over time due to changes in the operational frequency of the pump, for example. Such changes in pump noise may include changes in periodicity or changes in the shape of the periodic signal.

Embodiments of the invention measure pressure in a well with at least one sensor. It should be noted, however, that alternate embodiments could use sensors that measure parameters other than pressure. Sensors that measure flow, magnetic forces or gravitational force, for example, could also be used with the disclosed system. The measured pressure signal is analyzed and some periodic signals are attributed to pump noise. The telemetric signal is assumed to be of non-periodic (stochastic) nature. If that is not the case for a significant time frame, data scrambling techniques may be applied. The periodic pump signals are analyzed for changes that are occurring over time. The changes occurring over time are used to predict values of the periodic signals at a future point in time. Then, at that future point in time, the predicted values of the periodic signals are subtracted from the pressure signals being measured. The remaining pressure signals are then analyzed to read the telemetric data transmitted. Algorithms to determine a periodic signal and then subtract the predicted signal from a signal in real time are called "Linear Prediction" and are described in several textbooks including "Adaptive Filter Theory" by Simon Haykin, published by Prentice Hall.

Figure 2:
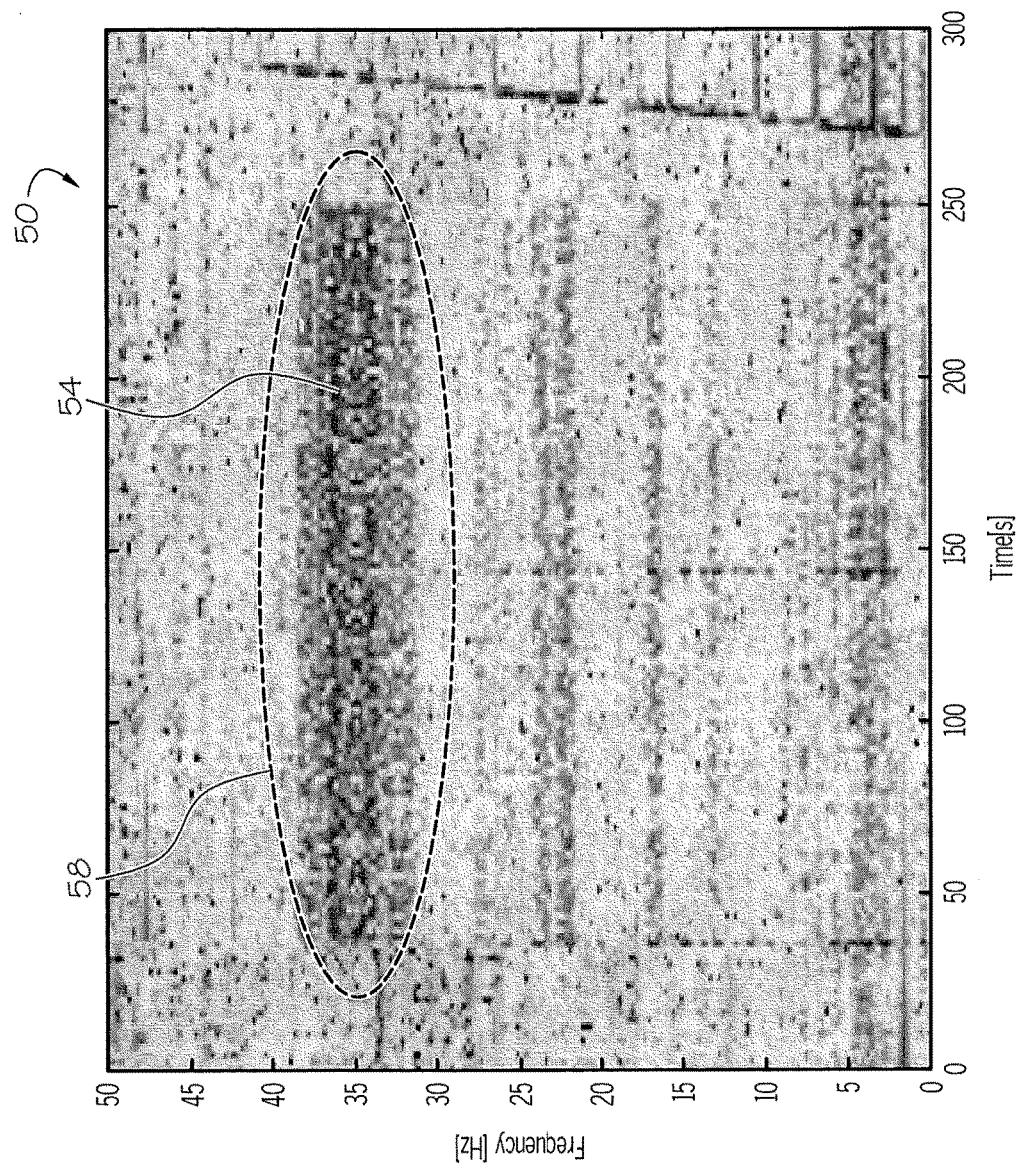
FIG. 2 depicts a spectrogram that has had received pump signals canceled by methods disclosed herein.

Referring to FIG. 2, a second spectrogram 50 disclosed herein is illustrated. The second spectrogram 50 corresponds to a received signal that has been modified by subtraction of predicted periodic noise, including noise attributed to pumps, as disclosed herein. The dark horizontal lines 38, of the periodic noise, as shown in FIG. 1 are substantially eliminated. A dark area 54 representative of a telemetric data signal 58 is easily observable.

Embodiments of the invention utilize mathematical algorithms in the analysis, prediction and subtraction of the periodic signals. For example, the received signal $r(k)$ can be expressed as the superposition of the telemetric signal $s_T(k)$ with the periodic signal $s_{PN}(k)$ and other noise $n(k)$.

$$r(k)=s_T(k)+s_{PN}(k)+n(k)$$

The periodic noise signal has a periodicity and signal shape that may be changing slowly over time. Therefore it can be predicted from its previous values $s_{PN}(k-\tau)$ except its variations. This can be done by a prediction filter $h_{pred}(k)$, which has to be adaptive to track variations of the periodic signal.

$$\tilde{s}_{PN}(k)=h_{pred}(k)*s_{PN}(k--\tau)$$

Subtracting the predicted periodic signal $\tilde{S}_{PN}(k)$ from the newest received signal, we get the telemetric signal distorted by noise and a pump noise prediction error $e_{PN}(k)$.

$$r(k)-\tilde{s}_{PN}(k)=s_T(k)+e_{PN}(k)+n(k)=\hat{e}(k)$$

This signal is used to control the adaptation of the prediction filter in a way that the mean squared error $E\{|\hat{e}(k)|^2\}$ of $\hat{e}(k)$ is minimal, which is only achievable by minimization of $e_{PN}(k)$ since the other signals are not predictable. If the mean squared error is minimal, $\hat{e}(k)$ equals the telemetric signal plus minimum remaining noise. Since, however, the pump signal $s_{PN}(k-\tau)$ is not directly available for prediction, the following may be used:

$$r(k--\tau)=s_T(k-\tau)+s_{PN}(k-\tau)+n(k-\tau)$$

which is the pump signal $s_{PN}(k-\tau)$ distorted by the weak telemetric signal $s_T(k-\tau)$ and noise $n(k-\tau)$.

Figure 3:
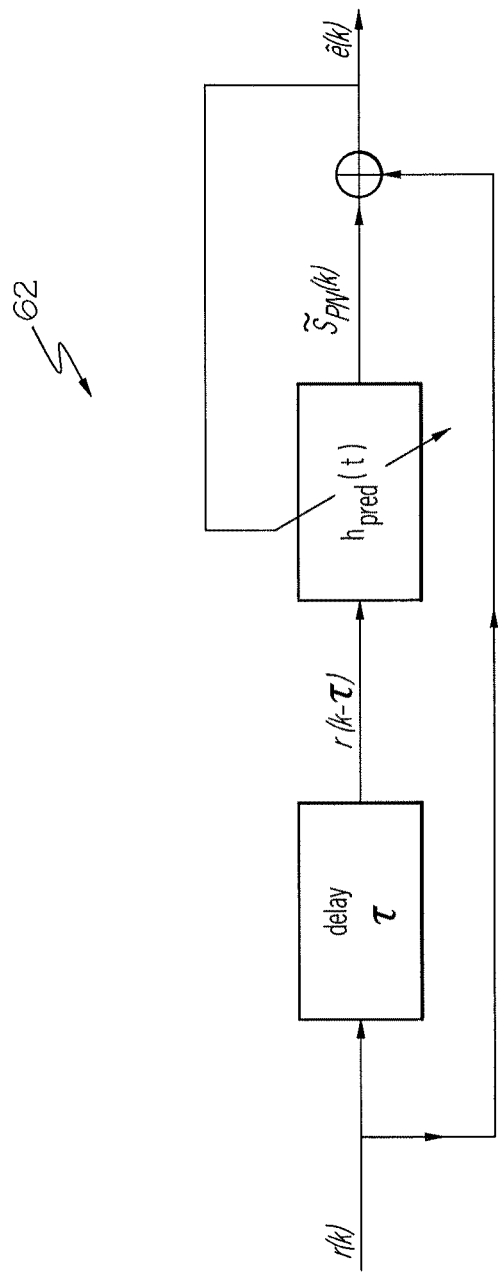
FIG. 3 depicts a linear prediction algorithm disclosed herein.

Referring to FIG. 3, a linear prediction algorithm 62 in accordance with an embodiment of the invention is illustrated.

As described above, embodiments may be in the form of processor-implemented processes and apparatuses for practicing those processes. In exemplary embodiments, the invention is embodied in processor program code. Embodiments include processor program code containing instructions embodied in tangible media, such as floppy diskettes, CD-ROMs, hard drives, or any other processor-readable storage medium, wherein, when the processor program code is loaded into and executed by a processor, the processor becomes an apparatus for practicing the invention. Embodiments include processor program code, for example, whether stored in a storage medium, loaded into and/or executed by a processor, or transmitted over some transmission medium, such as over electrical wiring or cabling, through fiber optics, or via electromagnetic radiation, wherein, when the processor program code is loaded into and executed by a processor, the processor becomes an apparatus for practicing the invention. The technical effect of the executable instructions is to cancel a pump signal received in a mud pulse telemetry system through analysis of data received by a single sensor.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of canceling noise in a logging or measurement while drilling system, comprising:
acquiring at least one signal in the system, the at least one signal indicating pressure, flow, gravity, or magnetism;
predicting at least one deterministic component of the at least one signal from past signal values of the at least one signal indicating the pressure, the flow, the gravity, or the magnetism using linear prediction based on periodicity of the at least one deterministic component; and subtracting the at least one predicted deterministic component from the acquired at least one signal.

2. The method of claim 1, wherein the acquiring is measuring.

3. The method of claim 2, wherein the measuring is carried out with a sensor.

4. The method of claim 1, further comprising attributing the at least one deterministic component to pump noise.

5. The method of claim 1, further comprising attributing the at least one deterministic component to at least one of a rotating member, a reciprocating member and a pulsing member.

6. A processor readable media having stored thereon a processor program product that is executed by the processor, the processor program product for canceling noise in a wellbore telemetry system in a processor environment, the processor program product comprising a storage medium readable by a processing circuit and storing instructions for execution by the processing circuit the processor readable media being readable by a processing circuit and the processor program product having instructions for execution by the processing circuit for facilitating a method comprising:
   acquiring at least one signal in the system, the at least one signal indicating pressure, flow, gravity, or magnetism;
   predicting at least one deterministic component of the at least one signal from past signal values of the at least one signal indicating the pressure, the flow, the gravity, or the magnetism using linear prediction based on periodicity of the at least one deterministic component; and
   subtracting the at least one predicted deterministic component from the acquired at least one signal, wherein the past signal values used in the predicting at least one deterministic component of the at least one signal are from the at least one signal.

7. The processor method of claim 6, further comprising attributing the at least one deterministic component to pump noise.

8. The processor method of claim 6, further comprising attributing the at least one deterministic component to at least one of a rotating member, a reciprocating member and a pulsing member.

9. A method of canceling noise in a downhole telemetry system, comprising:
   acquiring at least one signal in the system, the at least one signal indicating pressure, flow, gravity, or magnetism;
   predicting at least one deterministic component of the at least one signal from past signal values of the at least one signal indicating the pressure, the flow, the gravity, or the magnetism using linear prediction and a change of at least one deterministic component from past signal values based on periodicity of the at least one deterministic value; and
   subtracting the at least one predicted deterministic component from the acquired at least one signal.

10. The method of claim 9, wherein the past signal values used in the predicting at least one deterministic component of the at least one signal are from the at least one signal.

11. The method of claim 1, wherein the past signal values used in the predicting at least one deterministic component of the at least one signal are from the at least one signal.

\* \* \* \* \*